United States Patent [19]

Adams

[11] 4,253,642
[45] Mar. 3, 1981

[54] VALVE STEM LUBRICATING PLATE

[76] Inventor: Harold R. Adams, St. Francisville, Ill. 62460

[21] Appl. No.: 910,134

[22] Filed: May 26, 1978

[51] Int. Cl.³ .............................................. F16K 51/00
[52] U.S. Cl. ................................... 251/355; 137/242; 277/19; 277/24; 15/256.6
[58] Field of Search ................. 251/355; 137/298, 242; 15/256.5, 256.6; 277/24, 19, 72; 184/24, 25

[56] References Cited

U.S. PATENT DOCUMENTS

| 838,650 | 12/1906 | Rudd | 277/24 |
|---|---|---|---|
| 876,601 | 1/1908 | Slaydon | 184/24 |
| 989,641 | 4/1911 | Ragsdale | 277/24 |
| 1,258,692 | 3/1918 | Lowden | 184/25 |
| 1,530,812 | 3/1925 | Clegg | 184/25 |
| 1,670,241 | 5/1928 | Conner | 251/355 |
| 1,748,899 | 2/1930 | Pilla | 15/256.6 |
| 3,278,190 | 11/1966 | Wood et al. | 251/355 |

FOREIGN PATENT DOCUMENTS

| 754948 | 3/1967 | Canada | 277/24 |
|---|---|---|---|
| 62053 | 11/1913 | Fed. Rep. of Germany | 15/256.6 |
| 1215958 | 4/1960 | France | 277/24 |

Primary Examiner—Martin P. Schwadron
Assistant Examiner—A. Michael Chambers
Attorney, Agent, or Firm—Glenn K. Robbins

[57] ABSTRACT

A valve stem lubricating device. The lubricating device is designed for employment for use with valve stem valves that are difficultly accessible as in the interior of the valve yoke where the stem ends are protected and access is not available to the interior portion of the valve. The device is comprised of two hinged half sections or circular portions provided with lubricating material such that when the hinged sections are closed around the valve stem the lubricating material contacts the valve stem. The half sections are provided with an arcuate cut-out portion adapted to contact opposed vertical rod-like members of the valve yoke so that the cut-out portion can fit therearound. A friction fit can be made whereby the cut-out portion fits snuggly around the opposite support members forming the valve yoke. In a modification the lubricating device is provided with a super structure comprising two hinged half members which support inwardly extending wire bristles. When the device is closed together the wire bristles form a ring to contact threaded portions of the valve stem as it is operated to clean threads or the like of the valve stem and remove debris therefrom.

3 Claims, 6 Drawing Figures

U.S. Patent
Mar. 3, 1981
4,253,642
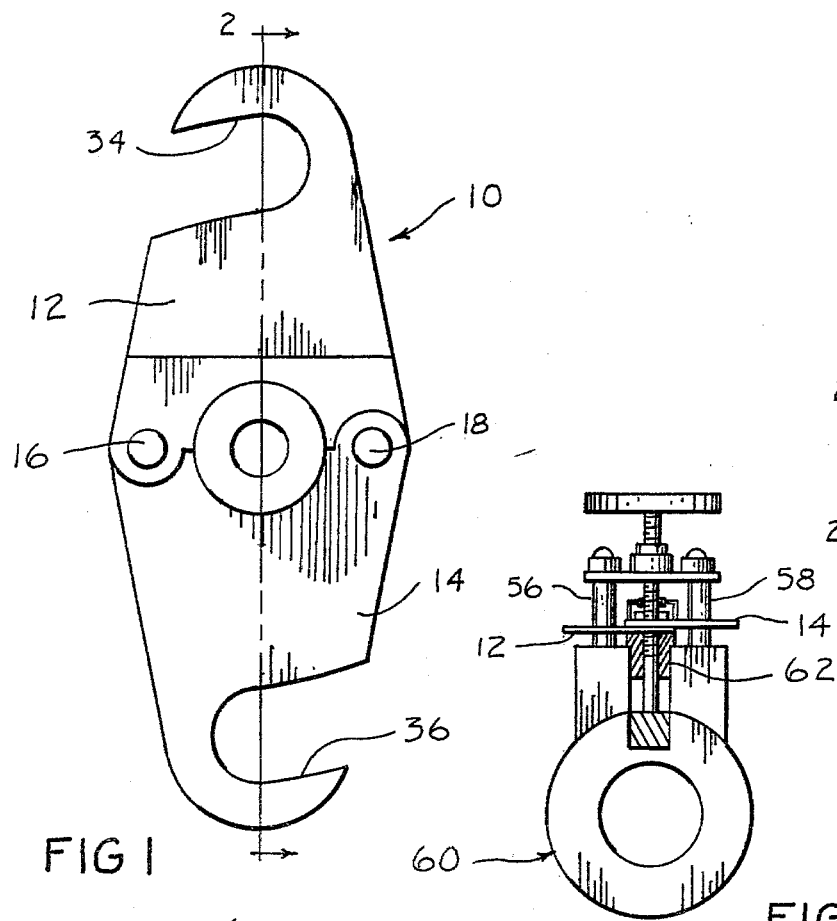
FIG 1
FIG 3
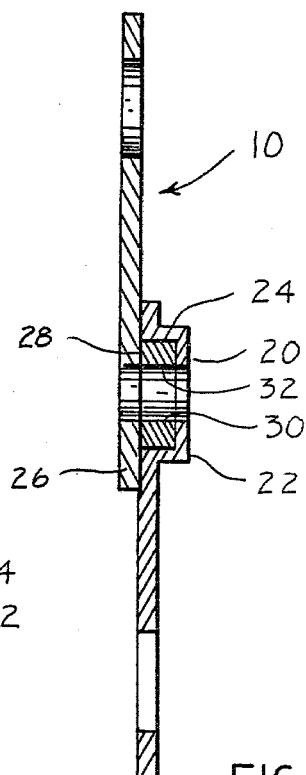
FIG 2
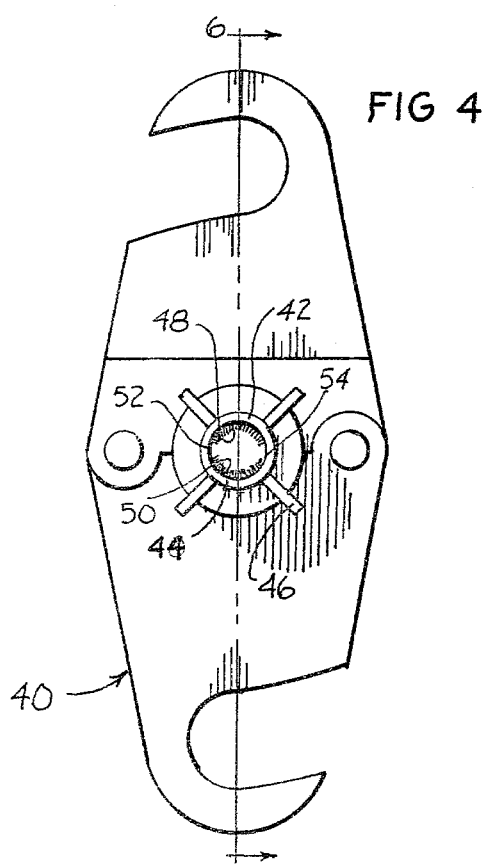
FIG 4
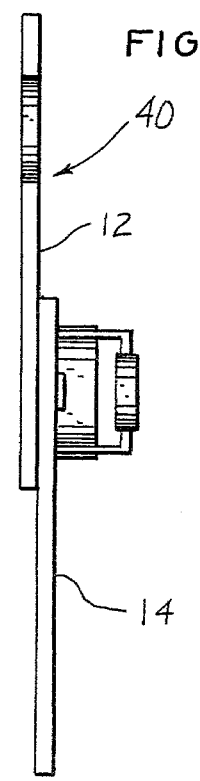
FIG 5
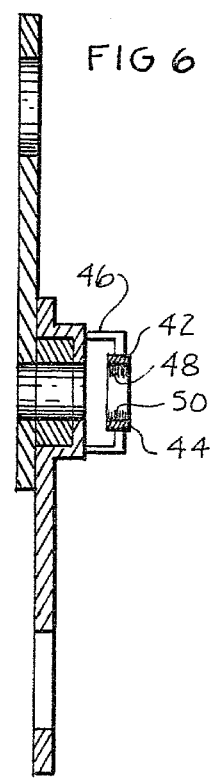
FIG 6

4,253,642

VALVE STEM LUBRICATING PLATE

SUMMARY OF THE INVENTION

In the past it has been a problem in various industrial installations to provide maintainance and protection for the valve stem of large pipe line valves used in the petroleum industry and other industrial installations. Such valve stems particularly when they are in the inaccessible portions of the valve yoke are difficult to keep clean when the surrounding environment is in the open as is the usual case where salt air and general exposure to the weather can cause great damage by rusting and the like of the valve stem. The interior of the valve yoke through which the valve stem is exposed is inaccessible at the ends and for access must normally be broken down requiring a high degree of repair and maintenance. The interior area is one that is open to exposure by the elements and various industrial contaminants in the atmosphere and is commonly troubled by rusting and pitting and other surface damage to the valve stem. The rusting and other types of corrosion of the valve stem causes difficulty in the operation of the valve stem and great trouble in the field requiring expensive maintenance and repair.

By means of the invention, there has been provided a valve stem lubricating device which can be simply employed on various types of large industrial valves. It is of particular advantage where valve yoke protects the valve stem which fits in between vertical upstanding members forming the yoke device. This area is difficult to maintain due to the inaccessibility of access to the free ends of the valve stem.

The lubricating device of this invention is in the form of hinged semi-circular sections which encirle the valve stem and provide lubricating areas. When hinged together about the valve stem the lubricating material which is supported in a cup-like structure, contacts the valve stem and lubricates it as the valve stem is rotated through periodic use. The device is simply supported on top of a packing gland and has at the ends of each of the half sections an arcuate cut-out portion which is engageable with the upstanding yoke members. The cut-out portions may be designed to engage the yoke members in a friction fit to be maintained in engagement within the yoke and supported on top of the packing gland.

In a modification, the valve stem lubricating device is provided with a cleaning brush structure. This structure incorporates semi-circular support structures which have inwardly extending wire bristles. The support structure is spaced above the lubricating device on top of the hinged plates and the device is hinged and fitted together around the valve stem. The wire bristles form a circular construction which contacts the threads of the valve stem. As the valve stem is rotated the bristles clean out the threads and the built-up rust, corrosion, pitting and other surface damage due to incrustation or the like on the valve stem surface.

The above features are objects of this invention and further objects will appear in the detailed description which follows and will otherwise be apparent to those skilled in the art.

For the purpose of illustration of this invention there is shown in the accompanying drawings a preferred embodiment and a modification thereof. It is to be understood that these drawings are for the purpose of example only and that the invention is not limited thereto.

IN THE DRAWINGS

FIG. 1, is a top plan view of the valve stem lubricator device;

FIG. 2, is a view in section taken on the line 2—2 of FIG. 1;

FIG. 3, is a view in vertical section taken through a valve having the valve stem lubricating and cleaning modification in the interior of the valve structure;

FIG. 4, is a top plan view of a modification employing a valve stem cleaning structure;

FIG. 5, is a view in side elevation taken from the left side of FIG. 4; and

FIG. 6, is a view in section taken on the line 6—6 of FIG. 4.

DESCRIPTION OF THE INVENTION

The valve stem lubricator device of this invention is generally identified by the reference numeral 10 in FIGS. 1 and 2. It is comprised of two sections 12 and 14 in plate-like form which are hinged together at a hinged pin 16. A conventional closure pin 18 is used to lock the open sides together when hinged shut.

A lubricating compartment 20 is provided on each of the plates. This compartment comprises semi-circular cup-shaped compartment 22 on the half section 14 and a similarly shaped compartment 24 on the half section compartment 12 defining an interior opening 26 and 28, respectively. A lubricating compound swab material is contained in each of the compartments and is designated by the reference numeral 30 and 32, respectively.

Whe the two half sections 12 and 14 are hinged together the lubricating material extends slightly inwardly from the compartments and is adapted to be compressed to contact and lubricate the surface of the valve stem as it is rotated.

In order to provide for the fastening of the valve stem lubricating device to the upstanding yoke members of the valve in which it is used the opposite ends of the sections 12 and 14 are provided with arcuate cut-outs 34 and 36, respectively. The cut-outs may be made of slightly tapering configuration in order that they may be wedged or frictionally fitted upon the upstanding members of the valve yoke.

A modification of the valve stem lubricating device is hown in FIGS. 4, 5, and 6 to incorporate wire cleaning bristles and is generally identified by the reference numearal 40. For the same structural parts the same reference numerals will be employed. This device likewise incorporates the two hinged half sections of the valve lubricating structure of the lubricating device 10. However, each of the half sections, has a superstructure supporting a pair of semi-circular wire brush members 42 and 44. The structure is supported by a pair of vertical support members 46 which support half ring members 48 and 50. Each of the half ring members is provided with radially inwardly extending wire bristles as best shown in FIGS. 4 and 6. As shown in FIG. 4, when closed together, the half ring members mate or butt together and the wire bristles extend substantially around the periphery of the valve stem. Gaps 52 and 54 are provided in the periphery of the bristles through which any debris may drop and be cleared from the cleaning structure.

USE

The valve stem lubricating device is very simply adapted to be used on the interior of the valve stem within a valve yoke in a valve 60 as best shown in FIG. 3. In such use the two half sections 12 and 14 are opened from one another and then fitted around the valve stem and rotated to the point where the arcuate sections 34 and 36 at the end of the plate engage the upstanding members 56 and 58 of the valve yoke. The valve stem lubricating device is further supported on top of the packing gland 62 as shown in FIG. 3, so that a firm and stable support structure is provided for the device. When the valve stem is rotated by operation of the valve hand wheel in normal use the interior surfaces of the lubricating compound or material 30 and 32 will wipe the valve stem surfaces and keep them lubricated. This lubrication enhances the operation and inhibits possible corrosion due to the protective layer of oil provided.

The modification 40 of FIGS. 4 through 6 is likewise very simply employed as described above. This device is fitted in the same fashion as previously described around the valve stem. The inwardly extending bristles 48 and 50 of the wire brush contact the valve stem threads and clean any rust, debris or the like which has been accumulating thereon. In this cleaning operation the debris that may be cleared is dropped through the gaps 52 and 54 to prevent built-up or accumulation.

Various changes and modifications may be made within this invention as will be readily apparent to those skilled in the art. Such changes and modifications are within the scope and teaching of this invention as defined by the claims appended hereto.

What is claimed is:

1. A valve stem cleaner and lubricator device for use with valves having an exposed threaded valve stem situated between a pair of elongated yoke elements, said device comprising a hinged plate member having a pair of half sections engageable with the valve stem to closely surround it, said half sections having a semi-circular compartment containing a packing and lubricating material engageable with the valve stem to provide a cleaning and lubricating function and means for engaging said plate member to said yoke elements, said means comprising arcuate slots in said half sections for receiving said yoke elements and means for locking said half sections together in a valve stem engaging position and wire brush means provided to clean the threads of the valve stem, said means comprising semi-circular support members supported on each of said aforementioned half sections and including means on each of said respective half sections to support said support members thereabove, each of said support members being provided with inwardly extending wire brush elements adapted to engage said threads when the cleaner and lubricator device is closed on the valve stem in said engaging position and wherein said valve stem is lubricated and cleaned by said plate member and brush means of said valve stem.

2. The valve stem cleaner and lubricator device of claim 1, in which said half sections are comprised of a rigid plate-like base having semi-circular openings facing one-another in the closed position and a semi-circular inverted dish-shaped element supported on top of said plate-like base and having a semi-circular opening facing one-another in the closed position and said semi-circular inverted dish shaped element supported on top of said plate like base and having said semi-circular opening in registry with the semi-circular opening in said base, said base and inverted dish shaped element defining the semi-circular compartment containing the packing and lubricating material.

3. The valve stem cleaner and lubriator device of claim 1, in which the wire brush elements extend radially inwardly and circumscribe the valve stem in arcuate segments, said segments being circumferentially spaced from one another to provide a gap for escape foreign matter cleaned from said threads.

* * * * *